United States Patent [19]
Feldblum et al.

[11] Patent Number: 5,286,338
[45] Date of Patent: Feb. 15, 1994

[54] METHODS FOR MAKING MICROLENS ARRAYS

[75] Inventors: Avi Y. Feldblum, Highland Park, N.J.; Keith O. Mersereau, Northampton, Pa.; Casimir R. Nijander, Lawrenceville; Wesley P. Townsend, Princeton, both of N.J.

[73] Assignee: AT&T Bell Laboratories, Murray Hill, N.J.

[21] Appl. No.: 24,035

[22] Filed: Mar. 1, 1993

[51] Int. Cl.$^5$ .................. B44C 1/22; C03C 15/00; C03C 25/06
[52] U.S. Cl. .................. 156/643; 156/626; 156/657; 156/659.1; 156/663; 252/79.1
[58] Field of Search .............. 156/626, 643, 654, 657, 156/659.1, 662, 663; 252/79.1

[56] References Cited

U.S. PATENT DOCUMENTS 4,813,762  3/1989  Leger et al. ............ 350/162.16
5,135,590  8/1992  Basavanhally et al. ........ 156/64

OTHER PUBLICATIONS

"A Process for Monolithic Fabrication of Microlenses on Integrated Circuits," Z. D. Popovic, SPIE, vol. 898 Miniature Optics and Lasers (1988), pp. 23-25.

"Ion-Beam Etching of InP and Its Applications to the Fabrication of High Radiance InGaAsP/InP Light Emitting Diodes", O. Wada, Journal of Electrochemical Society: Solid-State Science and Technology, Oct. 1984, vol. 131, No. 10, pp. 2373-2380.

"OSLO ® Series II and III Operating Manual," First Edition, Copyright 1991, Sinclair Optics Inc., Fairport, New York, pp. 3-6-3-8.

Primary Examiner—William Powell
Attorney, Agent, or Firm—Roderick B. Anderson

[57] ABSTRACT

During a reactive ion etching process (FIG. 5) for making lens elements (15, FIG. 4) in a silica substrate (12), the gas constituency in the reactive ion etch chamber is changed to adjust the curvature of lens elements formed in the silica substrate and to reduce the aberrations of such lens elements. For example, two gases, $CHF_3$ and oxygen may be supplied to the reactive ion etch chamber and, during the reactive ion etch process, the proportion of oxygen is significantly reduced, which reduces the aberrations of the lens elements formed by the process.

15 Claims, 3 Drawing Sheets

METHODS FOR MAKING MICROLENS ARRAYS

TECHNICAL FIELD

This invention relates to microlens arrays and, more particularly, to microlens arrays made by reactive ion etching.

BACKGROUND OF THE INVENTION

Miniature lenses or microlenses are increasingly in demand for such purposes as coupling light from a laser to an optical fiber and coupling light from an optical fiber to a photodetector. The U.S. patent of Basavanhally, U.S. Pat. No. 5,135,590, granted Aug. 4, 1992, describes a method for arranging optical fibers in a matrix configuration as is required, for example, for free-space switching. Such uses would normally require a matrix array of microlenses for containing light projected from the optical fiber ends. Thus, considerable effort has been made in developing methods for making arrays of microlenses which can be used as a unit, or from which individual lenses can be selected for use.

One promising method for making microlens arrays comprises the steps of forming an array of photoresist elements on a silica substrate, melting the elements to cause them to have curved or dome-shaped upper surfaces and thereafter solidifying the elements. The photoresist elements and the substrate are then subjected to reactive ion etching, that is, etching by a reactive gas in which the reaction is enhanced by applied radio frequency power. The photoresist elements cause differential etching in the substrate such that, after all of the photoresist has been etched, the dome shapes of the original photoresist elements are replicated in the silica substrate.

We have found that the reactive ion etching (RIE) method of making microlens arrays often results in lenses having undesirable aberrations. Such aberrations can result in significant losses of optical energy and can limit the functions of optical apparatus. Accordingly, there is a continuing need in the industry for dependable methods for making high quality microlens arrays.

SUMMARY OF THE INVENTION

In accordance with the invention, during the reactive ion etching process described above, the gas constituency in the reactive ion etch chamber is changed to adjust the curvature of lens elements formed in the silica substrate and to reduce the aberrations of such lens elements. For example, two gases, $CHF_3$ and oxygen, may be supplied to the reactive ion etch chamber and, during the reactive ion etch process, the proportion of oxygen is significantly and deliberately reduced, which reduces the aberrations of the lens elements formed by the process.

These and other objects, features and benefits of the invention will be better understood from a consideration of the following detailed description taken in conjunction with the accompanying drawing.

DETAILED DESCRIPTION

Figure 1:
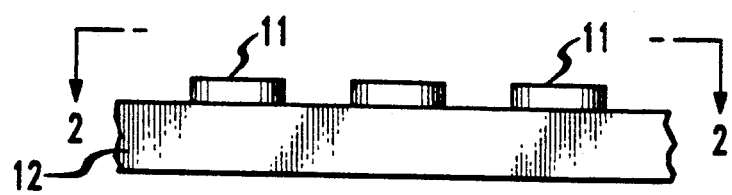
FIG. 1 is a sectional view of part of a silica substrate upon which photoresist elements have been formed for the purpose of making a microlens array.
Figure 2:
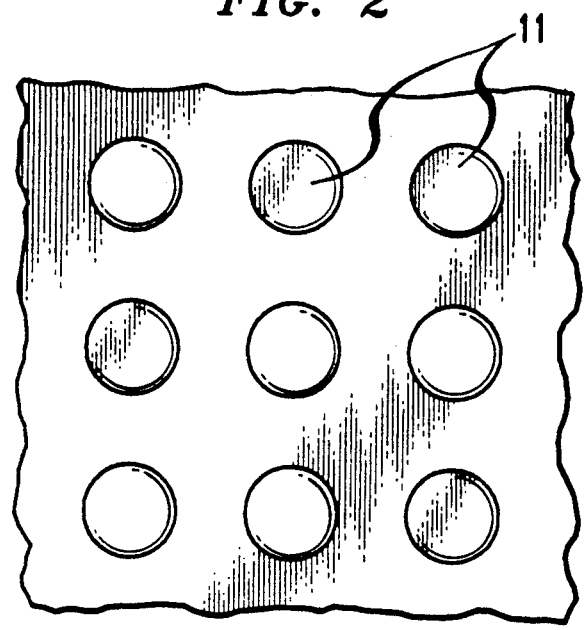
FIG. 2 is a top view of FIG. 1.
Figure 3:
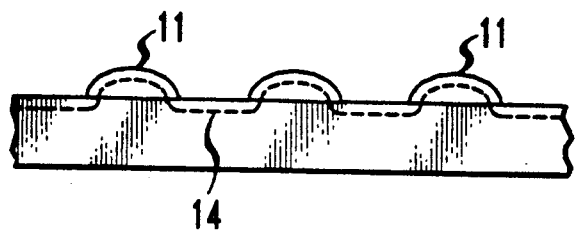
FIGS. 3 and 4 illustrate the structure of FIG. 1 at subsequent stages in the fabrication of a microlens array.

Referring now to FIGS. 1 and 2, the first step in making a microlens array by the RIE process is to form an array of photoresist elements 11 on a silica substrate 12. Referring to FIG. 3, the photoresist elements are melted, which causes them to assume the curved or dome shapes shown. That is, surface tension causes the upper surface of the molten photoresist to form a curved shape. The photoresist elements are then hardened to stabilize them in that configuration.

Figure 4:
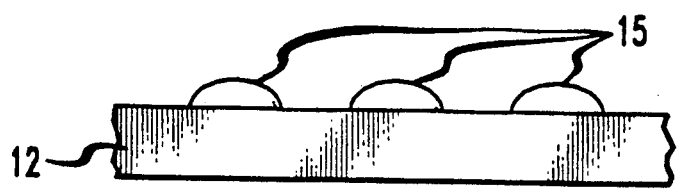
Figure 5:
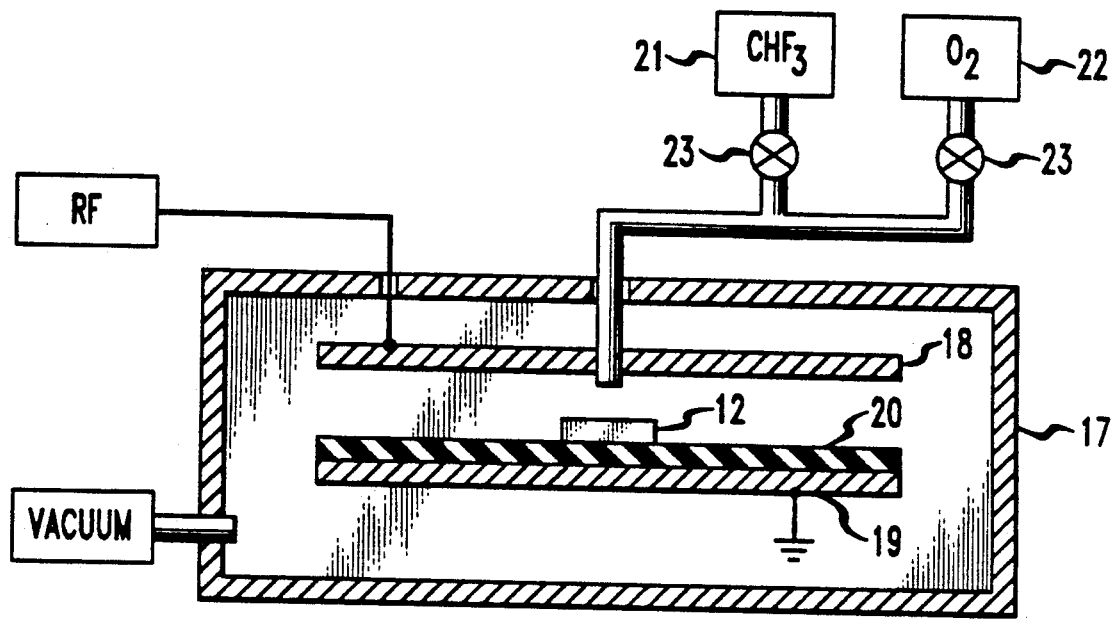
FIG. 5 is a schematic view of apparatus for reactive ion etching microlens arrays in accordance with an illustrative embodiment of the invention.

Next, the structure is placed in a reactive ion etch reactor of the type shown in FIG. 5 which exposes its upper surface to an etch gas, the reactivity of which is enhanced by the application of radio frequency power. The reactive ions of the gas etch both the photoresist elements and the silica substrate such that, after a period of time, the surface of the structure is that shown by dotted line 14 of FIG. 3. Further reactive ion etching etches deeper into the substrate and completely etches away the photoresist elements 11 to leave an array of bumps in the substrate 12. Referring to FIG. 4, these bumps constitute microlenses 15 on the upper surface of the silica substrate 12. In operation, each microlens includes the portion of the substrate 12 that it overlies.

It is to be understood that the substrate 12 may be any of various materials useful as microlenses, such as gallium arsenide, silicon, indium phosphide, zinc selenide, various glasses, or sapphire. The material must ordinarily be one which is transparent to the light with which it is to be used, unless the lens is to be coated for use as a mirror, or is otherwise to be used as a reflector, in which case the substrate need not be transparent to the light.

The elements 11 of FIG. 1 are conveniently formed in photoresist by masking and development, but other materials such as various polymers (e.g., acrylates) that can be melted to make dome-shaped elements could alternatively be used as elements 11. Microlenses typically have diameters of from fifty to several hundred microns and are regularly spaced at distances of from ten or twenty to several hundred microns, the substrate 12 being several hundred microns thick, as is appropriate for its subsequent use.

Referring to FIG. 5, the reactive ion etch is done, as is known in the art, in a reactor 17 having opposite electrodes 18 and 19. A gas such as a mixture of $CHF_3$ and oxygen, supplied by sources 21 and 22 and controlled by valve devices 23, is flowed into the reactor to provide a small gas pressure within the reactor, which is otherwise evacuated. The substrate 12 to be etched is placed on an insulative member 20, typically a quartz plate, on the electrode 19 and subjected to both the gas atmosphere and rf power supplied as shown to electrode 18. Typical parameters may be as follows: pressure, thirty-five microns of mercury; r-f power, 240 watts; frequency, 13.56 megahertz; gas flow rate, 5-50 standard cubic centimeters per minute. The gas mixture may typically consist of ninety-six percent $CHF_3$ and four percent $O_2$. These parameters are normally empirically optimized to suit different requirements. As is known, various other active etching gases that could be used include $SiCl_4$, $BCl_3$, $Cl_2$, $CHCl_2F$, which may be used alone or in combination with other gases such as $O_2$ and $SF_6$. The reactor 17 may be of a type available from the Plasma Technology Company of Avon, England. The resist used was Shipley 1650, available from the Shipley Company of Newton, Mass.

The problem with which the invention is concerned is the tendency of the FIG. 5 apparatus to make lens arrays having optical aberrations. It can be shown that an aberration-free silica microlens would have a negative conic constant describing its upper surface geometry, which is in the nature of a hyperbolic, parabolic, or elliptical profile. Conic constants are discussed, for example, in the publication, "OSLO ® Series II and III Operating Manual," First Edition, Copyright 1991, Sinclair Optics Inc., Fairport, N.Y. In distinction, a spherical surface would have a zero conic constant, whereas lenses etched as described above tend, undesirably, to have positive conic constants.

Figure 6:
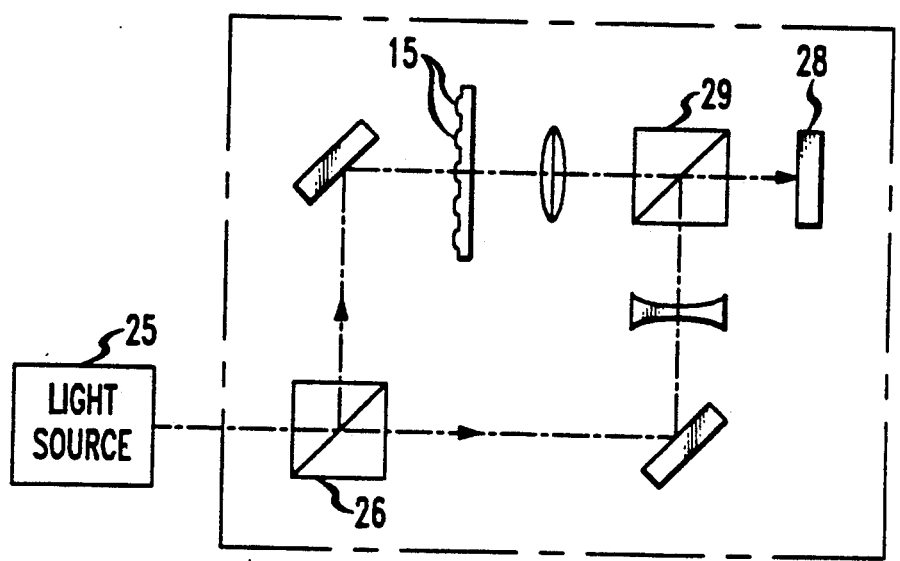
FIG. 6 is a schematic view of interferometer apparatus for determining aberrations in a microlens in accordance with one aspect of the invention.
Figure 7:
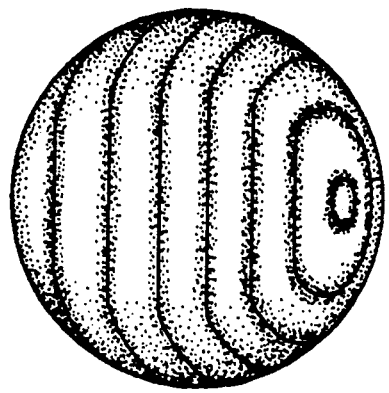
FIGS. 7-9 are views of interference fringe patterns formed by the apparatus of FIG. 6.
Figure 8:
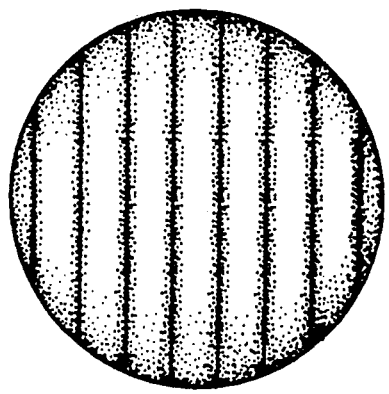
Figure 9:
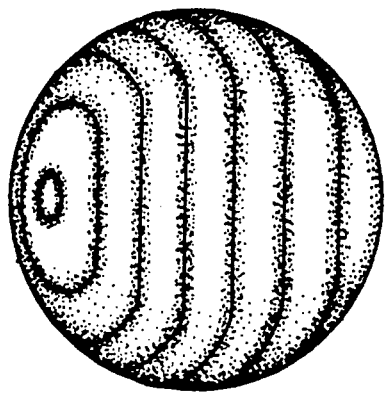

Aberrations can be analyzed in the interferometer apparatus shown in FIG. 6 in which coherent light from a source 25 is split in a beam splitter 26, directed through a microlens 15 of a microlens array and projected on a screen 28. Part of the beam from source 25, known as the reference beam, is directed to a beam splitter 29 where it is allowed to interfere with the beam projected through the microlens 15. It can be shown that, with a properly focused aberration-free lens, interference fringes projected on screen 28 will be in the form of substantially parallel lines as shown in FIG. 8. Aberrations cause the interference fringes to form curved or bent lines and loops on the screen 28 as shown in FIGS. 7 and 9.

We have found that the surface profiles of the microlenses can be adjusted by varying the proportion of oxygen flowed into the apparatus of FIG. 5 during etching, thereby to reduce or eliminate aberrations. Specifically, during etching, the oxygen is reduced by typically at least fifteen percent. Because of the difficulty of predicting minute changes in etch rate, it is recommended that for each microlens design, the oxygen be reduced during production, with the lenses tested in the apparatus of FIG. 6 to determine empirically the proportion of reduction of oxygen needed to reduce aberrations to the level desired. This methodology will be illustrated by the following three examples, all of which employ an RIE atmosphere of $O_2$ and $CHF_3$.

EXAMPLE I

The goal here was to make silica ($SiO_2$) microlenses having a diameter of three hundred ninety microns, a radius of curvature of six hundred fifty microns plus or minus fifty microns, a focal length of 1.4 millimeters at six hundred thirty-three nanometers optical wavelength, and a peak-to-valley optical path length difference (OPD) of less than one-half wavelength at six hundred thirty-three nanometers, which is a measure of lens aberration.

The initial attempt was to use reactive ion etching to transfer photoresist lens shapes into four inch $SiO_2$ wafers by the prior art method. This was done by etching for nine hundred ninety-nine minutes with 3.23 percent oxygen, with the remainder, 96.77 percent, being $CHF_3$; that is, the total gas flow rate consisted of 3.23 percent $O_2$ and 96.77 percent $CHF_3$. The photoresist height before etching was 30.5 microns which resulted in a lens height (known as lens sag) of 32.6 microns after etching. Using the apparatus of FIG. 6, it was determined that the lens had about five wavelengths of wavefront aberration at six hundred thirty-three nanometers of optical wavelength. This corresponds to a conic surface with a conic constant of +3.8 whereas, as mentioned above, a zero or negative conic constant was required. The interference fringe pattern had severe fringe curvature to the right as shown in FIG. 7.

In the second experiment, the lenses were etched using three different RIE gas compositions of oxygen and $CHF_3$, with 5.3 percent oxygen for three hundred minutes, followed by 4.4 percent oxygen for three hundred sixty minutes, followed by 3.6 percent oxygen for five hundred minutes, the remainders being $CHF_3$. The resulting lens had a sag of 33.6 microns and an OPD of two wavelengths. While this lens was an improvement over the previous experiment, it did not meet specifications; the interference pattern still had a pronounced curvature to the right.

In the third experiment, RIE etching was made with 5.36 percent oxygen for three hundred minutes, 4.6 percent oxygen for three hundred sixty minutes, and 3.6 percent oxygen for five hundred minutes. The resulting lens had a sag of 33.6 microns, a radius of curvature of six hundred fifty-two microns and less than one-half wavelength of aberration, thereby meeting specifications. The fringe pattern consisted of parallel, nearly vertical lines as shown in FIG. 8.

EXAMPLE II

It was desired to make a microlens of fused silica with a diameter of two hundred thirty microns, a radius of curvature of two hundred fifty microns plus or minus fifty microns and a wavefront aberration characterized by an OPD of less than one quarter wavelength at six hundred thirty-three nanometers wavelength. An initial etch was done with 3.64 percent oxygen, the remainder $CHF_3$, for seven hundred forty minutes. This yielded an OPD of about 1.5 wavelengths; that is, there were uncorrected aberrations giving a fringe pattern as shown in FIG. 7.

In the next experiment, the etch was with 5.3 percent oxygen for two hundred eighty minutes, 4.4 percent for three hundred twenty minutes and 3.6 percent for four hundred minutes. This resulted in about 1.5 waves of aberration, but this was an over-correction because the fringes were in the opposite direction from the first experiment, as illustrated in FIG. 9. In the next experiment, we used 4.3 percent oxygen for ninety minutes, 3.8 percent oxygen for ninety minutes and 3.6 percent oxygen for five hundred sixty minutes. This yielded less than one wavelength of aberration, but it was under-corrected, and the fringes curved to the right as in FIG. 7.

In the next experiment, the formula used was 4.7 percent oxygen for two hundred eighty minutes, 4.1 percent for three hundred twenty minutes and 3.6 percent for four hundred minutes. This yielded virtually an aberration-free lens with parallel fringes as in FIG. 7. We therefore arrived at these empirical rules:

To correct an "under-corrected" lens, increase the rate at which oxygen is reduced from the beginning of the etch to the end. Such a lens has a slope which is too flat at the center (or too curved at the edge) of the lens. To correct an "over-corrected" lens, then one must do the opposite, that is, reduce the rate of oxygen reduction. Constant oxygen gives undercorrection and thus oxygen should normally be reduced during the etching.

EXAMPLE III

Here, the attempt was to make microlenses having a diameter of one hundred sixty-five microns. The wavefront aberration was to be no worse than one quarter wavelength at six hundred thirty-three nanometers. We began using a formula close to the one that worked for Example I. This formula was 5.1 percent oxygen for two hundred seventy-six minutes, 4.4 percent for two hundred seventy-six minutes and 3.8 percent for four hundred thirty-two minutes. The result was about 1.5 to two wavelengths over-corrected (fringes as in FIG. 9). In the next experiment, the oxygen concentrations were reduced so that 4.2 percent oxygen was used for two hundred fifty-six minutes, 3.8 percent for two hundred fifty-six minutes, and 3.6 percent for four hundred two minutes. The result was much better, but this time was under-corrected (fringes as in FIG. 7) by as much as a half wavelength.

The next experiment was to use 4.3 percent oxygen for one hundred ninety-three minutes, 3.8 percent for one hundred ninety-three minutes and 3.6 percent for three hundred four minutes. This resulted in essentially aberration-free lenses (fringes as in FIG. 8).

Further experiments were made reducing oxygen for 4.4 to 3.6 percent during etching but making the changes more frequently and in smaller steps. Thus, in one experiment, we used eight different gas ratios and in another, seven different gas ratios. We found that, with changes approaching a continuous change of the etchant gas ratio, lens surfaces having less abrupt changes in slope could be made with straight parallel interference fringes being obtained.

As mentioned before, various other constituencies can be used for the RIE atmosphere, and various other materials can be used for the lens substrate and for the masking elements. Such changes would be reflected in differences in the adjustment of RIE atmosphere to eliminate aberrations. Such determinations can be made by those skilled in the art without resort to undue experimentation by the methodology described. In principle, a profilometer measurement of the curvature of microlenses can be made as an alternative to the interferometic measurements described, but interferometric measurements are preferable at this time because of present equipment accuracy and reliability. Various other embodiments and modifications may be made by those skilled in the art without departing from the spirit and scope of the invention.

We claim:

1. A method of forming a lens array comprising the steps of: forming a plurality of first elements of a first material overlying a substrate of a second material; at least partially melting the first elements to cause them to have curved upper surfaces and thereafter solidifying the first elements; locating the substrate and the first elements in a reactive ion etch chamber having gas input apparatus; reactive ion etching the substrate and said plurality of first elements such that differential etching of the substrate produces lens elements in the substrate; wherein the improvement comprises: during the reactive ion etch step, deliberately changing the gas constituency in the reactive ion etch chamber to adjust the curvature of lens elements formed in the substrate and to reduce aberrations of such lens elements.

2. The method of claim 1 wherein:
at least two different gases are supplied through the gas input apparatus;
and the step of changing the gas constituency comprises the step of changing the ratio of said two different gases.

3. The method of claim 1 wherein:
the second material is silica, and the first material is a photoresist material.

4. The method of claim 2 wherein:
the two gases are $CHF_3$ and oxygen.

5. The method of claim 4 wherein:
during the reactive ion etch step, the proportion of oxygen supplied is reduced by more than about fifteen percent.

6. The method of claim 4 wherein:
at the beginning of the reactive ion etch step, the proportion of oxygen supplied is in the range of 3.8 percent to 5.3 percent, and at the end of the reactive ion etch step, the proportion of oxygen is in the range of 3.1 percent to 3.6 percent, and the remainder of the gas supplied is $CHF_3$.

7. The method of claim 1 wherein:
during the reactive ion etch step, the substrate and elements are subjected to radio frequency power which enhances said reactive ion etch.

8. The method of claim 1 further comprising the steps of:
after the reactive ion etch step, locating the substrate in interferometer apparatus;
directing a first light beam through one of said lens elements and thereafter causing the first light beam to interfere with a reference beam to form interference fringes.

9. The method of claim 8 further comprising the steps of:
using the reactive ion etch step to form a plurality of different lens elements in a plurality of different substrates;
after each reactive ion etch step, using the interferometer apparatus to produce interference fringes;
and using a different formula for changing the gas constituency of each successive reactive ion etch in response to information deduced from a study of said interference fringes.

10. The method of claim 1 further comprising the steps of:
using reactive ion etching to form a plurality of different lens elements in a plurality of different substrates;
after each reactive ion etch step, determining the aberrations in the lens elements formed thereby;
and using information from said determination of aberrations to adjust the change of gas constituency during a successive ion etch step.

11. The method of claim 10 wherein:
the step of determining aberrations in the lens element comprises the step of projecting light through a lens element in an interferometer and causing said projected light to interfere with reference beam light to form interference fringes.

12. The method of claim 10 wherein:

at least two different gases are supplied through the gas input apparatus;

and the step of changing the gas constituency comprises the step of changing the ratio of said two different gases.

13. The method of claim 12 wherein:

the two gases are $CHF_3$ and oxygen;

and during each reactive ion etch step, the proportion of oxygen is reduced by more than about fifteen percent.

14. The method of claim 13 wherein:

at the beginning of each reactive ion etch step, the oxygen is in the range of 3.8 percent to 5.3 percent, and at the end of each reactive ion etch step, a proportion of oxygen is in the range of 3.1 percent to 3.6 percent, and the remainder of the gas constituency is $CHF_3$.

15. The method of claim 12 wherein:

during the reactive ion etch step, the ratio of the two gases is changed substantially continuously.

* * * * *